Figure 1:
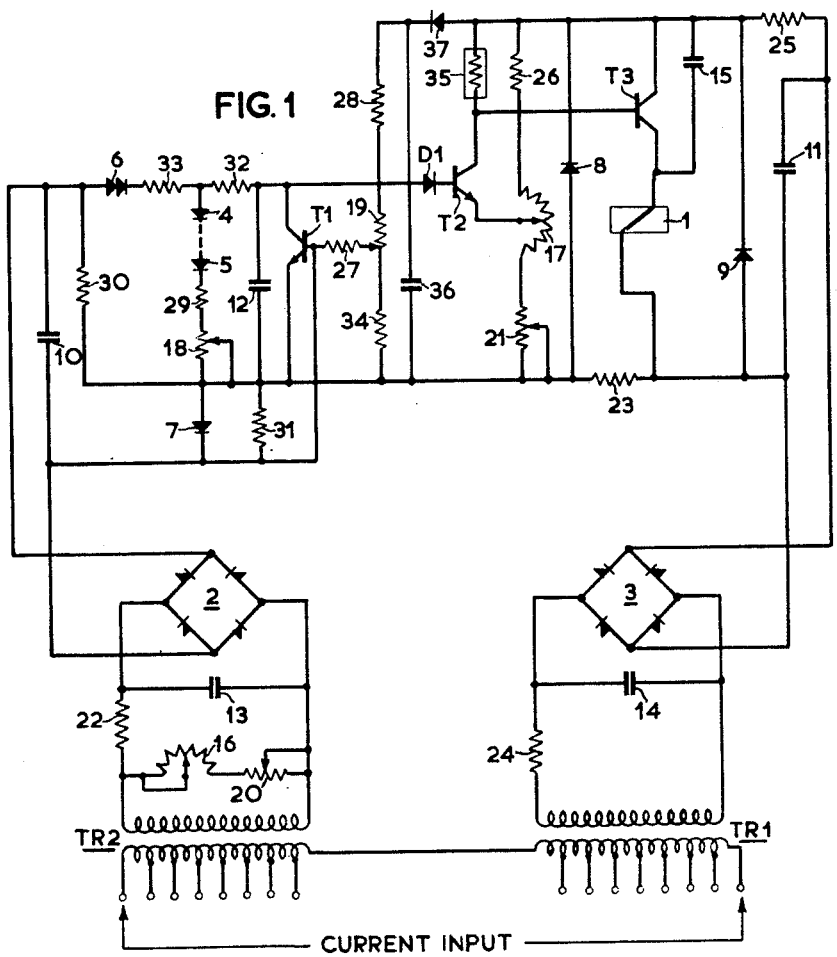

INVENTORS:
EUGENIUSZ ANTOSZEWSKI
JOHN WILLIAM FREDERICK SHERRIFF

Attorneys 3,160,788
ELECTRICAL PROTECTIVE RELAYS
Eugeniusz Antoszewski and John William Frederick Sherriff, Stafford, England, assignors to The English Electric Company Limited, London, England, a British company
Filed May 22, 1961, Ser. No. 111,580
Claims priority, application Great Britain, June 9, 1960, 20,256/60
9 Claims. (Cl. 317—36)

This invention relates to electrical protective relays of the time-overcurrent or time-overvoltage kind, and to timing means therefor.

It is an object of the present invention to vary the characteristic of such a relay, particularly with a view to increasing its operating time at relatively high or relatively low overcurrents or overloads.

According to the invention, in or for an electrical protective relay of the kind having an operating time related to the magnitude of a uni-directional overcurrent or overvoltage operating signal, timing means comprise a capacitor arranged to be charged by said signal and non-linear resistor means connected in circuit with said capacitor in such manner as to retard its charging when said signal is relatively high or relatively low.

Said non-linear resistor means preferably comprise a rectifier or a non-linear resistor known as a "Metrosil" (registered trademark) and may be connected in series and/or parallel with a fixed or variable linear resistor.

Preferably said timing means include first non-linear resistor means connected in parallel with said capacitor and adapted to retard its charging by a relatively high operating signal, and second non-linear resistor means connected in series with said capacitor and adapted to retard its charging by a relatively low operating signal.

Where first and second said non-linear resistor means are employed, said first resistor means may be connected, at one end thereof, to the junction between two portions of a linear resistor forming part of said second resistor means.

Pick-up control of said electrical protective relay may be provided by shunting said capacitor by a variable impedance device adapted to be conductive at and below normal current or voltage conditions thereby preventing said capacitor from charging, and to be rendered non-conductive above said normal conditions thereby enabling said capacitor to charge. Said variable impedance device may comprise a transistor in combination with means for applying to its base a biasing voltage adapted to render said transistor conductive in the absence of a said operating signal, and means for applying to the base of said transistor, when a said operating signal is present, an operating voltage of opposite polarity to said biasing voltage, whereby said transistor is rendered non-conductive.

Preferably said transistor is of the n-p-n type, and said biasing and operating voltages are of relatively positive and negative polarity respectively.

Figure 2:
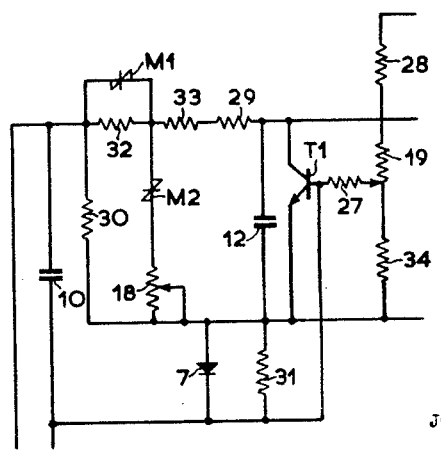

An electrical protective relay according to the invention, in the form of a time-overcurrent relay, will now be described, by way of example, with reference to the accompanying drawings, in which:

FIG. 1 shows a circuit diagram of the relay comprising a timing unit wherein said non-linear resistor means are rectifiers, an overload detector, a measuring and tripping circuit and a power supply unit for the components of the measuring and tripping circuit, and FIG. 2 shows a circuit diagram of an alternative timing unit for the relay.

In FIG. 1 the overload detector includes a current transformer TR2 having a tapped primary winding which is connected in series with a similar tapped primary winding of another current transformer TR1 constituting part of the power supply unit for the components of the measuring and tripping circuit to be referred to hereinafter in greater detail. The secondary winding of current transformer TR2 is shunted by two series connected variable resistors 16 and 20 to provide infinitely variable adjustment over the current setting range and connected to a full-wave rectifier bridge 2 via a series resistor 22 and a shunt-connected capacitor 13. Peaks in the voltage waveform resulting from saturation of current transformer TR2 charge capacitor 13 and produce a voltage drop across resistor 22, the rectifier bridge 2 thus being protected from said saturation effects.

The output from the rectifier bridge 2 is smoothed by a shunt-connected capacitor 10 and applied to the timing unit comprising essentially a rectifier 6 connected in series with a resistor composed of two series connected portions 33 and 32, and a capacitor 12 shunted by a series arrangement of a chain of rectifiers 4, 5, a fixed resistor 29 and a variable resistor 18, the said series arrangement being connected at one end of the junction between the two resistor portions 33 and 32. The function of the said series arrangement 4, 5, 29 and 18 is to increase the operating time of the relay at relatively high overloads, fine adjustment being provided by the variable resistor 18. This increase in the operating time results from non-linear resistance characteristic of the chain of rectifiers 4, 5, whose resistance decreases as the voltage thereacross increases, so that progressively more current is shunted through the branch containing these rectifiers as the operating signal increases, at the expense of charging current through the capacitor 12.

The function of the rectifier 6 is to increase the operating time of the relay at relatively small overloads. This increase in the operating time results from the non-linear resistance characteristic of the rectifier 6, whose resistance increases as the voltage thereacross decreases, so that progressively more charging current is allowed to flow through the capacitor 12 as the operating signal decreases.

The combined result of these two increases in the operating time is the provision of a relay characteristic curve which corresponds with that frequently required of an electrical protective relay, for example British Standard No. 142. The latter is one of the Standard Specifications published by the British Standards Institution and lays down operating times, at the maximum time setting (time multiplier=1) of 2.2, 3.0, 4.3 and 10.0 seconds at 20, 10, 5 and 2 times the operating current expressed as a multiple of the current setting, respectively.

The reasons for connecting the series arrangement 4, 5, 29 and 18 to the junction between the two resistor portions 33 and 32 are firstly to avoid imposing on the transformer TR2 a non-linear load by reason of the non-linear resistance characteristic of the rectifiers resulting in variation of the current setting in view of the slightly saturating nature of the said transformer for the purpose of obtaining the desired relay characteristic, and secondly to introduce temperature compensation additional to that hereinafter described.

Pick-up of the relay is determined by a transistor T1 of the n-p-n type connected by its collector and emitter terminals across the capacitor 12. The transistor T1 is rendered conducting by a positive bias applied to its base and derived from a potentiometer connected variable resistor 19 connected in a series combination between fixed resistors 28 and 34 across an H.T. supply hereinafter described through a fixed resistor 27, whereby the charging of the capacitor 12 is prevented under normal operating conditions of the circuit protected by the relay. The resistors 30 and 31 form a potential divider, the voltage developed across resistor 31 being applied as a negative operating voltage to the base of transistor T1. The relay circuit parameters are so arranged that under full load conditions the said negative operating voltage equals the said positive bias voltage thus cancelling out the latter and rendering the transistor T1 non-conducting whereby a charge is enabled to build up across the capacitor 12. Upon removal of overload conditions transistor T1 is again rendered conducting by reason of the said positive bias on its base and the capacitor 12 discharges rapidly whereby instantaneous re-set of the relay is ensured.

It will be appreciated that the temperature characteristics of a transistor such as T1 are such that at higher temperatures the voltage across capacitor 12 required to render transistor T1 conducting is reduced; but since the rectifier chain 4, 5 has a negative temperature coefficient of resistance a rise in temperature increases the proportion of current shunted through the path 4, 5, 29, 18 at the expense of charging current for capacitor 12, a certain amount of compensation for temperature effects on transistor T1 is achieved, this being the additional temperature compensation hereinbefore referred to.

To protect transistor T1 against excessive voltage which may, for example be developed under 20 or 30 times full load conditions, a silicon diode 7 is connected as shown for the purpose of limiting this voltage.

The measuring and tripping circuit has a form described in United States patent application Serial No. 33,687 filed June 3, 1960 (applicant E. Antoszewski), and now Patent No. 3,117,253. It comprises two germanium-type transistors, T2, T3 connected to form stages of a two-stage amplifier circuit. An input signal derived from the terminals of the capacitor 12 is applied through a germanium-diode D1 to the base-emitter circuit of transistor T2. This transistor is of the n-p-n type and has its emitter connected to a potentiometer connected variable resistor 17 which is connected in a series combination between a fixed resistor 26 and a variable resistor 21, across the H.T. supply of the first stage of the amplifier.

This H.T. supply is derived from the secondary winding of the current transformer TR1 via a series resistor 24 a shunt-connected capacitor 14 and a full wave rectifier bridge 3 whose output is smoothed by a shunt connected capacitor 11. Resistor 24 and capacitor 14 fulfil the same function as resistor 22 and capacitor 13, in relation to current transformer TR1 and rectifier bridge 3. An infinitely variable adjustment across the secondary winding of current transformer TR1 is not required since variations in the supply voltage can be tolerated without the relay characteristic being affected.

This supply is applied to the second stage of the amplifier via a series resistor 25 and a shunt-connected stabilizing zener diode 9, to improve voltage regulation and to the first stage of the amplifier via a further series resistor 23 and a further shunt-connected zener diode 8. A thermistor 35 is connected in the collector circuit of the transistor T2 and provides the output signal of the first stage of the amplifier, supplying this as an input signal to the base emitter circuit of the transistor T3 which is of the p-n-p type. An auxiliary relay 1 is connected in the collector circuit of this transistor T3 and a capacitor 15 is connected between the collector and emitter of this transistor to protect it from high transient voltages produced by the relay 1 during a switching operation. Alternatively, capacitor 15 may be connected across auxiliary relay 1. In operation, the potentiometer connected variable resistor 17 is maintained at a stable potential by the action of the voltage limiter network formed by diode 8 and resistor 23. The potential of the potentiometer tapping of resistor 17 determines the threshold level of the signal appearing across the terminals of capacitor 12 which will render the transistor T2 conducting. The current produced in the thermistor 35 by this conductive state is detected and amplified by the transistor T3 which then operates the auxiliary relay 1. The germanium diode D1 is operative to diminish the collector-base leakage current of the transistor T2 which flows back through the timing circuit in the reverse direction.

The function of the thermistor 35 is to provide the temperature compensation feature hereinbefore referred to, in the measuring and tripping circuit to compensate for the temperature effect on the transistors. This compensation is particularly necessary where a transistor such as the transistor T2 is controlled by a small input current because under these conditions, where the input current is of the same order as the leakage current of the transistor, the excessive temperature sensitivity of the leakage current becomes important. It is to be noted that the circuit must operate with a low input current if the timing action of the timing circuit is not to be unduly upset by a power drain on the timing capacitor 12.

A capacitor 36 is connected across the series resistor combination 28, 19, 34 and blocked off from the tripping circuit by a diode 37. This capacitor 36 and diode 37 together form a memory circuit which enables the time constants of the tripping circuit and of the timing circuit to be kept short (thus ensuring substantially instantaneous reset of the auxiliary relay 1 and rapid charging of the timing capacitor 12 when the relay is switched on into a fault), whilst providing a long enough time constant for the base bias voltage of the transistor T1 to ensure that it is kept conducting long enough for the timing capacitor 12 to discharge completely after a tripping operation, when otherwise the collapse of the load current and the consequent collapse of the D.C. bias potential on the base of the transistor T1 would rapidly render it non-conducting and thus open-circuit the discharge path for the capacitor 12. Thus the time constants of the tripping and timing circuits are kept short by keeping the capacitance of the capacitor 11 low, and the time constant of the base bias voltage of the transistor T1 is made high by suitable choice of the capacitance of the capacitor 36 of the memory circuit which is prevented from affecting the time constant of the tripping and timing circuits by the blocking action of the diode 37.

A slight variation of the timing circuit of FIG. 1 is shown in FIG. 2, in which the rectifier chain 4, 5 is replaced by a "Metrosil" (registered trademark) M2, and the rectifier 6 is replaced by a "Metrosil" M1. A "Metrosil" is a non-linear electrical resistance element composed mainly of ball clay, Carborundum and graphite. The operation of the relay is exactly the same as hereinbefore described with reference to FIG. 1, since "Metrosils" have similar characteristics to rectifiers as regards their use in the circuit under consideration.

What we claim as our invention and desire to secure by Letters Patent is:

1. Timing means for an electrical protective relay of the kind having an operating time related to the magnitude of a unidirectional overcurrent or overvoltage operating signal, said timing means comprising a capacitor arranged to be charged by said signal, first resistor means, including first non-linear resistor means, connected in parallel with said capacitor and adapted to retard its charging when the operating signal becomes relatively high, and second resistor means, including second non-linear resistor means, connected in series with said capacitor and adapted to retard its charging when the operating signal is relatively low.

2. Timing means according to claim 1, wherein a said non-linear resistor means comprises a rectifier.

3. Timing means according to claim 1, wherein a said non-linear resistor means comprises an element composed mainly of ball clay, Carborundum and graphite.

4. Timing means according to claim 1, wherein said second resistor means includes two portions of a linear resistor having a junction therebetween, and one end of said first non-linear resistor means is connected to said junction.

5. Timing means according to claim 1 and further including a variable impedance device connected in shunt with said capacitor, said device being adapted to be conductive at and below normal current or voltage conditions, thereby preventing said capacitor from charging, and to be rendered non-conductive above said normal conditions, thereby enabling said capacitor to charge.

6. Timing means according to claim 5, wherein said variable impedance device comprises a transistor and including, in combination with said transistor, means for applying to its base a biasing voltage adapted to render said transistor conductive in the absence of a said operating signal, and means for applying to said base, when said operating signal is present, an operating voltage of opposite polarity to that of said biasing voltage, whereby said transistor is rendered non-conductive.

7. Timing means according to claim 6 and further including a memory circuit adapted to prolong said biasing voltage after interruption of the normal biasing supply, whereby, upon operation of the relay the transistor is kept conductive for a sufficient time for the capacitor to discharge.

8. Timing means according to claim 7, wherein the memory circuit comprises a further capacitor connected across said supply and a circuit element adapted to prevent the increased time constant introduced into the timing means by said memory circuit from affecting the time constants of other relay components.

9. Timing means according to claim 8 wherein said circuit element comprises a diode connected in the supply of said biasing voltage.

References Cited in the file of this patent

UNITED STATES PATENTS 2,977,510    Adamson _____ Mar. 28, 1961